United States Patent [19]
Erlemann et al.

[11] 3,892,844
[45] July 1, 1975

[54] METHOD OF PROTECTING THE SKIN FROM ULTRAVIOLET RADIATION

[75] Inventors: Gustav Erlemann, Basel, Switzerland; Dr. Hellmut Ippen, Haan, Germany

[73] Assignee: Hoffmann-La Roche Inc., Nutley, N.J.

[22] Filed: July 20, 1972

[21] Appl. No.: 273,561

Related U.S. Application Data

[63] Continuation-in-part of Ser. No. 883,993, Dec. 12, 1969, abandoned.

[30] Foreign Application Priority Data

Dec. 16, 1968  Switzerland................. 18694/68

[52] U.S. Cl. ...................... 424/59; 424/47; 424/60; 424/168; 424/172
[51] Int. Cl.².......................................... A61K 7/42
[58] Field of Search ............ 424/251, 253, 254, 59, 424/47

[56] References Cited
UNITED STATES PATENTS
3,448,190   6/1969   Baron et al. .......................... 424/59

OTHER PUBLICATIONS

Merck Index, 8th edition, An Encyclopedia of Chemicals and Drugs, 10/28/68, pp. 319, 510, 1092 and 1093.

Wempen et al., Chem. Abstracts, 1964, Vol. 60, pp. 12007 and 12008.

Chang et al., Chem. Abstracts, 1966, Vol. 64, p. 15876.

Gershon, Chem. Abstracts, 1957, Vol. 60, pp. 15109–15110.

*Primary Examiner*—Albert T. Meyers
*Assistant Examiner*—Dale R. Ore
*Attorney, Agent, or Firm*—Samuel L. Welt; Jon S. Saxe; R. Hain Swope

[57] ABSTRACT

Radiation screening preparations comprising a substance selected from the group consisting of cytosine, uracil, guanine 5-chlorouracil and mixtures thereof are described. Synergistic combinations of these substances and conventional radiation screening materials are also described.

4 Claims, No Drawings

METHOD OF PROTECTING THE SKIN FROM ULTRAVIOLET RADIATION

RELATED APPLICATION

The present application is a continuation-in-part of U.S. patent application Ser. No. 883,993 filed Dec. 12, 1969 now abandoned.

BACKGROUND OF THE INVENTION

This invention relates to new and useful radiation screening preparations and to methods of protecting the human skin against the harmful effects of sunlight.

The skin responds differently to the different wavelengths of electromagnetic radiation. In sunlight, visible and infrared radiation (3900A. to 14,000A.) produce a transient reddening of the skin due primarily to heating. The well-known tanning effect of the sun is produced by near ultraviolet radiation between 3200A. and 3900A. which is pigmetogenic. The ultraviolet radiation of between 2900A. and 3200A. will induce erythema which may be severe in fair-skinned individuals. It is the object of sunscreen agents to prevent erythema of the skin by ultraviolet rays having a wavelength between 2900A. and 3200A. Conventional sunscreen agents are classified according to how they accomplish this object.

One group of conventional sunscreen powders protect the skin by forming a reflective barrier thereon. Examples of such agents are kaolin, talc and pigments such as zinc oxide, magnesium carbonate, aluminum hydroxide and the like. Most common pigments also exhibit some absorption of ultraviolet light.

A second major group of sunscreens protect the skin by the absorption of wavelengths in the erythemal range, i.e. between about 2900A. and 3200A. The comparative effectiveness of such substances as aids in tanning is dependent on how much of the tanning wavelengths they absorb in addition to those in the erythemal range. Many such agents are known as will be enumerated hereinafter.

It has been surprisingly found in accordance with the present invention that certain compounds possess the ability to protect the human skin against the potentially harmful ultraviolet rays of sunlight in the erythemal range yet neither possess the masking capability of conventional barrier type sunscreen powders nor have a maximum light absorption between 2900A. and 3200A.

BRIEF DESCRIPTION OF THE INVENTION

The present invention pertains to sunscreening preparations containing as an active ingredient a substance selected from the group consisting of cytosine, uracil, guanine, 5-chlorouracil and mixtures thereof, and synergistic combinations of such substances with conventional sunscreen agents which are characterized by a maximum light absorption between 2900A. and 3200A.

DETAILED DESCRIPTION OF THE INVENTION

The sunscreening preparations provided in accordance with the present invention contain as the essential active ingredient a substance selected from the group consisting of cytosine, uracil, guanine 5-chlorouracil and mixtures thereof. These active materials are applied to the skin in combination with a compatible carrier material which may be aqueous, alcoholic, fatty or a combination of these. Carrier materials as contemplated herein include those materials generally utilized as a base for sunscreen preparations such as, for example, creams, milks, ointments, gels, oils, lotions, aerosol sprays or the like. Such carrier materials, in order to be suitable, must be selected on a basis of their dermatological acceptability and compatability with the specific active ingredient of the present invention which is utilized. Preferred among carrier formulations for the sunscreen agents of the present invention are creams, milks, ointments, lotions and aerosols.

Examples of suitable carrier materials for the formulation of the sunscreen compositions of the invention include the paraffins, waxes, vegetable or animal oils and fats such as, for example, olive oil, sesame oil, peanut oil and the like, wool fat, spermaceti, esters of fatty acids such as stearic, palmitic and oleic as well as the acids themselves, glycerides of said acids, ethyl, isopropyl, cetyl, stearyl and palmityl alcohols, emulsifying agents of all common types, e.g. nonionic, anionic or cationic suitable for the preparation of both water-in-oil and oil-in-water emulsions, thickeners such as, for example, the commercially available cellulose ethers, trajacanth, alginic acid or salts thereof and the like. A particularly preferred emulsifying agent is polyoxyethylene stearyl ether having a molecular weight of about 700 and commercially available under the trademark Brij J by Atlas Powder Co., Wilmington, Del. Additional additives which may be incorporated into the sun-screen preparations of the invention are preservatives, buffers, pH regulators to adjust the pH thereof to approximate that of the skin, perfumes, physiologically compatible dyestuffs and the like. A preferred pH regular in accordance with the invention is lactic acid. Other agents which have medicinal or therapeutic value may also be incorporated in the compositions of the invention. Where the sunscreen preparations of the invention are in the form of aerosol sprays or foams, suitable conventional propellants, i.e. polyhalogenated hydrocarbons are also included therein. It is contemplated that where the compositions of the invention are in aerosol form, the propellant will comprise about 10% by weight of said compositions.

The concentration of the active sunscreen ingredient in dermatologically acceptable carrier preparations such as contemplated herein is between about 1% and about 30% by weight and preferably between about 2% and about 5% by weight.

Wherein the sunscreen preparations of the invention contain mixtures of more than one of the active ingredients, such active ingredients may be combined in any proportions. It is preferred, however, to combine two or more of such ingredients in approximately equimolar concentrations.

It has unexpectedly been found that the sunscreen preparations of the present invention are more effective under conditions which would cause a strong erythema of the unprotected skin than under conditions which would produce little or no erythema of the unprotected skin. In contrast, conventional sunscreen preparations which protect by absorption of ultraviolet light between about 2900A. and 3200A. are comparatively uneffective under those conditions which would produce a strong erythema of the unprotected skin. This unexpected phenomenon of the sunscreens of the present invention is particularly advantageous as the purpose of a sunscreen is not to entirely prevent the sun's ultraviolet radiation from reaching the skin but to reduce its intensity so as to enable the skin to build up its own protection.

It is also contemplated herein to combine the active ingredients of the sunscreen preparations of the present invention with conventional light screening substances to achieve a synergistic radiation screening effect. In general, each member of the synergistic pair is utilized in from about one-fourth to about one-half of its usual effective concentration. The exact concentration to be utilized in the case of any such conventional agent is easily calculated from the recommended dosage as it known and readily available in the art. The concentration of the sunscreen agents of the present invention to be utilized in such preparations is likewise easily calculated from the ranges disclosed above and in the examples which follow. The preparation of compositions such as contemplated herein is considered to be well within the purview of one skilled in the art. Generally, such conventional sunscreen agents are present in the preparations of the invention in from about 1% by weight to about 20% by weight.

By conventional light-screening substances are meant those organic compounds whose light absorption maximum lies between about 2900A. and 3200A. This property is characteristic of many organic compounds belonging to diverse classes of compounds which are recognized in the art as sunscreens. For purposes of brevity only representative examples of such compounds will be listed hereafter. More detailed lists may be found, for example, in most recognized texts on cosmetology. Conventional light-screening agents of this type which is capable of forming synergistic radiation screening combinations with the active ingredients of the present invention include the following:

1. Derivatives of a p-aminobenzoic acids such as, for example, esters such as ethyl, propyl, butyl and isobutyl p-aminobenzoate, ethyl p-dimethylaminobenzoate, glyceryl p-aminobenzoate, amyl p-dimethylaminobenzoate and the like;

2. Derivatives of cinnamic acid such as, for example, 2-ethoxyethyl p-methoxycinnamate, ethylhexyl p-methoxycinnamate, p-methoxycinnamic acid mixed esters and cinnamic acid mixed esters;

3. Dibenzylhydrazines;

4. Derivatives of 2-phenylbenzimidazole such as, for example, 2-phenylbenzimidazole-5-sulphonic acid;

5. Derivatives of salicylic acid such as, for example, salicylic acid menthyl ester, salicylic acid homomenthyl ester and salicylic acid phenyl ester;

6. Derivatives of benzophenone such as, for example, 4-phenylbenzophenone, 4-phenylbenzophenone-2-carboxylic acid isooctyl ester and 5-chloro-2-hydroxy-benzophenone;

7. Derivatives of coumarin such as, for example, 7-hydroxy-coumarin, β-umbelliferoneacetic acid and 6,7-dihydroxycoumarin;

8. Derivatives of gallic acid such as, for example, digalloyl trioleate;

9. Dehydroacetic acid (3-acetyl-6-methyl-1,2-pyran-2,4-dione);

10. Derivatives of quinoline such as, for example, the sodium salt of 8-ethoxyquinoline-5-sulphonic acid;

11. Derivatives of anthranilic acid such as, for example, anthranilic acid menthyl ester; and 12. Hydroxyphenylbenztriazole.

The compositions of the invention afford excellent protection from the erythemal rays of the sun thereby preventing painful sunburn. These compositions may be applied freely to the skin in whatever amount the user finds to be effective for the degree of protection desired. As with any conventional suntan preparation, such amounts vary with the exposure conditions, the sensitivity and pigmentation of the skin of the user and the like. Therefore, what constitutes an effective amount of the preparations of the invention is within the discretion of the user.

The following examples serve to further illustrate the invention.

EXAMPLE 1

Testing of the radiation screening action of the compositions of the present invention was demonstrated utilizing the Schulze "Mean-Screening Factor" as described in Parfümerie und Kosmetik 37, p. 310–365 (1956). In this method, the skin of the backs of 20 adult volunteers of differing age, sex and skin type were divided into horizontal sections utilizing adhesive tape. The preparation being tested was applied to each alternate section of skin thus leaving untreated sections as controls. The skin sections were then divided into eight fields of about 1 square centimeter in size by means of vertical strips of tape. Skin areas other than the area of testing were covered with material. The test area was then irridated at a separation of 40 cm utilizing a group of 4 Osram Ultravitalux lamps which had been turned on for at least 5 minutes prior to the beginning of the test. As irradiation time increased, the vertical rows of test areas were covered according to the geometric series 1, 1.4, 2, 2.8 minutes, etc. and the irridation was terminated at 11.2 or 16 minutes. All tapes were thereupon removed and erythema swelling time, e.g. the irridation time required to produce erythema, was determined 24 hours later.

The results of the irridation test were determined in the following manner. The vertical rows were numbered and the first instance of a discernible erythema was determined on the horizontal rows. From this data the screening factor for the particular preparation may then be determined in accordance with the following formula:

$$\text{Screening Factor} = \frac{\text{Erythema Swelling Time of Screened Skin}}{\text{Erythema Swelling Time of Unscreened Skin}}$$

The mean-screening factor for the particular preparation was then calculated according to the arithmetic mean. The results of this test appear in the following table.

| Active Substance | Concentration Percent | Screening Factor (Calculated from 20 Individual Values) |
|---|---|---|
| Cytosine | 4.27 | 2.85 |
| Uracil | 4.31 | 2.30 |
| Guanine | 5.80 | 2.91 |
| 5-Chloro-Uracil | 5.62 | 2.63 |
| Guanine + 2-ethoxy-ethyl-p-methoxycinnamate | 2.05 each | 7.46 |
| Ointment Base (control) | | 1.41 |

For the above screening tests the following ointment base was utilized as a control and as a vehicle for the active ingredients being tested:

| Ingredient | Amount in Grams |
| --- | --- |
| Polyoxyethylene stearyl ether | 5.0 |
| White petrolatum | 5.0 |
| Stearyl alcohol | 15.0 |
| Propylene glycol | 11.5 |
| Distilled water | 63.5 |
| | 100.0 |

The ointments containing the above active ingredients were manufactured in the following manner. 5.80 Grams (0.0385 mole) of guanine (2-amino-6-hydroxypurine) were dissolved in a heated mixture of 56.7 ml. of distilled water, 11.50 g. of propylene glycol and 1.0 ml. of concentrated ammonia solution. This solution was heated to a temperature of 75°C. and added to a mixture having a like temperature consisting of 15.0 g. of stearyl alcohol, 5.0 g. of white petrolatum and 5.0 g. of polyoxyethylene stearyl ether, molecular weight about 700. While the resulting mixture was still hot, lactic acid was added to adjust the pH thereof to about 5.5 to approximate the pH of skin. The resulting mixture was thereafter cooled to form a cream which was further worked utilizing a three-roller frame and filled into tubes.

In an analogous manner, ointments were prepared utilizing the following ingredients to form the initial solutions:

a. 4.27 Grams (0.0385 mol) of cytosine in 53.23 ml. of distilled water, 11.5 g. of propylene glycol and 1.0 ml. concentrated ammonia;

b. 4.51 Grams of (0.0385 mol) of uracil in 56.19 ml. of distilled water, 11.5 g. of propylene glycol and 1.0 ml. concentrated ammonia;

c. 5.62 Grams (0.0385 mol) of 5-chloro uracil in 56.35 ml. of distilled water, 11.5 g. of propylene glycol and 1.53 g. of sodium hydroxide;

d. 2.0 Grams of guanine, in 60.7 ml. distilled water, 11.5 g. propylene glycol and 0.80 sodium hydroxide. In this example, the solution was heated to 75°C. and added to a mixture having a like temperature and containing 2.0 grams of 2-ethoxy-ethyl-p-methoxycinnamate, 13.0 grams of stearyl alcohol, 5.0 grams of polyoxyethylene stearyl ether, molecular weight about 700 and 5.0 grams of white petrolatum, the pH adjusted with lactic acid and the mixture cooled to form a cream which was worked up as above.

EXAMPLE 2

An ointment was prepared by first dissolving 3.0 g. (0.020 mol) guanine and 2.0 g. (0.018 mol) cytosine in a hot mixture of 57.5 g. of distilled water, 11.5 g. of propylene glycol and 1 ml. of concentrated ammonia solution. The resulting solution was heated to 75°C. and added with stirring to a hot (75°C.) mixture of 17.0 g. of stearyl alcohol, 4.0 g. of white petroleum jelly and 4.0 g. of a polyoxyethylene stearyl ether, molecular weight about 700. Lactic acid was added while the emulsion was still hot to adjust the pH thereof to a pH approximating that of skin, i.e. about 5.5. After cooling, the resulting cream was further worked utilizing a three-roller frame and filled into tubes.

EXAMPLE 3

An ointment was prepared by first dissolving 2.0 g. guanine, 2.81 g. 5-chloro-uracil and 2.26 g. uracil in a hot mixture of 53.93 g. of distilled water, 14 g. of propylene glycol and 1 ml. of concentrated ammonia solution. The resulting solution was heated to 75°C. and added with stirring to a hot (75°C.) mixture of 17.0 g. of stearyl alcohol, 4.0 g. of white petroleum jelly and 4.0 g. of a polyoxyethylene stearyl ether, molecular weight about 700. Lactic acid was then added to the hot emulsion to adjust the pH thereof to approximate the pH of the skin, i.e. about 5.5. After cooling, the resulting cream was further worked using a three-roller frame and filled into tubes.

EXAMPLE 4

An ointment was formed by first dissolving 1.42 g. (0.0128 mol) cytosine in a hot mixture of 61.28 g. of distilled water, 11.5 g. of propylene glycol and 0.8 g. of sodium hydroxide. The resulting solution was heated to 75°C. and added with stirring to a hot (75°C) mixture of 13.0 g. stearyl alcohol, 5.0 g. of white petroleum jelly, 5.0 g. of polyoxyethylene stearyl ether and 2.0 g. of 2-ethylhexyl-p-methoxycinnamate. Lactic acid was added to the hot emulsion to adjust the pH thereof to approximate the pH of the skin which is about 5.5. After cooling, the resulting cream was further worked using a three-roller frame and filled into tubes.

EXAMPLE 5

An ointment was formed as above by first dissolving 1.87 g. (0.128 mol) 5-chlorouracil in a hot mixture of 60.83 g. of distilled water, 11.5 g. of propylene glycol and 0.8 g. of sodium hydroxide. The resulting solution was heated to 75°C. and added with stirring to a hot (75°C.) mixture of 13.0 g. stearyl alcohol, 5.0 g. of white petroleum jelly, 5.0 g. of polyoxyethylene stearyl ether and 2.0 g. of p-dimethylaminobenzoate. Lactic acid was added to the hot emulsion to adjust the pH thereof to approximate the pH of the skin which is about 5.5. After cooling, the resulting cream was further worked using a three-roller frame and filled into tubes.

EXAMPLE 6

An aerosol preparation was formed from the following formulation.

| Ingredient | Weight in Grams |
| --- | --- |
| Phase I | |
| Isopropyl myristate | 18 |
| Stearic acid, cosmetic grade | 30 |
| Myristic acid, cosmetic grade | 9 |
| Glycerin | 18 |
| Phase II | |
| Water | 440 |
| Triethanolamine | 20 |
| Cytosine | 12 |
| Phase III | |
| Panthenol | 6 |
| Suitable perfume | 3 |
| 2-Ethoxyethyl-p-methoxy cinnamate | 12 |
| Lactic acid q.s. pH | 5.5 |

Phase I and Phase II were separately heated at a temperature of about 75°C. Thereafter, Phase II was added dropwise with vigorous stirring to Phase I which was maintained at a temperature of 75°. The mixture was then cooled to above 50°C. with stirring and the first three ingredients of Phase III added thereto. The resulting emulsion was mixed and the pH adjusted to about 5.5 with lactic acid. The emulsion was then cooled with stirring to about 20°C.

Nine parts by weight of the emulsion formed above were combined with one part by weight of a propellant (40 dichlorodifluoromethane / 60 dichlorotetrafluoroethane) under pressure in suitable aerosol containers equipped with conventional valve apparatus and foam-forming head.

EXAMPLE 7

An x-ray-screening agent in aerosol form having the following compositions:

| | |
|---|---|
| Hydrogenated, ethoxylated (10 mol) lanoline | 2.0 g |
| Triglyceride of capryl-caprylic acid | 7.0 g |
| Cetylalcohol | 0.7 g |
| Stearylalcohol | 0.7 g |
| Paraffin oil (light weight) | 5.0 g |
| Ethylhexyl-p-methoxy cinnamate | 2.5 g |
| Stearic acid | 3.0 g |
| Guanine, micronized | 2.0 g |
| Demineralized water | 75.1 g |
| Triethanolamine | 0.8 g |
| Perfume | 0.2 g |
| Rectified alcohol | 1.0 g | was manufactured as follows:

A mixture of 2.0 g hydrogenated, ethoxylated (10 ml) lanoline, 7.0 g of triglyceride of capryl-caprylic acid, 0.7 g cetylalcohol, 0.7 g stearyl alcohol, 5.0 g paraffin oil, 2.5 g ethylhexyl-p-methoxy cinnamate and 3.0 g stearic acid was melted at 70°C. After addition of 2.0 g micronized guanine, 0.8 g methanolamine in 75.1 g demineralized water were added at 70°C with stirring to the resulting suspension. The mixture was stirred for 15 minutes and then cooled. 0.2 g of perfume and 1.0 g of rectified alcohol were added at 45°C. The resulting mixture was stirred until cold and an emulsion with a viscosity of 550 Cp was obtained. 88 parts by weight of said emulsion were mixed in an aerosol container with 7.2 parts by weight dichloro di fluoromethane and 4.8 parts by weight dichlorotetrafluoroethane.

EXAMPLE 8

An xray-screening agent in milk form having the following composition:

| | |
|---|---|
| Hydrogenated, ethoxylated (10 mol) lanoline | 1.8 g |
| Triglyceride of fatty acid of coconut | 7.0 g |
| Cetylalcohol | 0.6 g |
| Stearylalcohol | 0.6 g |
| Paraffin oil (light weight) | 5.0 g |
| Ethylhexyl-p-methoxy cinnamate | 2.5 g |
| Stearic acid | 3.0 g |
| Guanine, micronized | 2.0 g |
| Demineralized water | 72.2 g |
| Triethanolamine | 0.8 g |
| Perfume | 0.5 g |
| Carboxyvinylpolymer | 2.0 g |
| Conservation agent | 2.0 g | was manufactured as follows:

A mixture of 1.8 g hydrogenated, ethoxylated (10 mol) lanoline, 7.0g triglyceride of fatty acid of coconut, 0.6 g cetylalcohol, 0.6 g stearyl alcohol, 5.0 g paraffin oil, 2.5 g ethylhexyl-p-methoxy cinnamate and 3.0 g of stearic acid was melted at 70°C. After addition of 2.0 g micronized guanine 2.0 g carboxyvinylpolymer in 72.2 g demineralized water were added at 70°C with stirring to the resulting suspension. The mixture was stirred for 15 minutes and then cooled. 0.8 g of triethanolamine and 0.5 g of perfume were added at 60°C and 45°C respectively The resulting mixture was stirred until cold and a white milk, which was stable at 3000 Rpm for 1 hour was obtained. Viscosity: 6000 Cp (Broockfield, Spindel, 5,10 Rpm).

We claim:

1. A method of protecting skin from erythema inducing ultraviolet radiation which comprises applying to the skin an effective amount of a sunscreen composition comprising from about 1% by weight to about 30% by weight of an active ingredient comprising a compound selected from the group consisting of cytosine, uracil, guanine, 5-chlorouracil and mixtures thereof, and an inert, dermatologically acceptable carrier material selected from the group consisting of an ointment, a cream, a milk, a lotion and an aerosol.

2. A method in accordance with claim 1 wherein said active ingredient comprises from about 2% to about 5% by weight of said composition.

3. A method in accordance with claim 1 wherein said carrier material is a milk and the active ingredient is in micronized form.

4. A method of protecting skin from erythema inducing ultraviolet radiation which comprises applying to the skin an effective amount of a sun-screen composition comprising an inert dermatologically acceptable carrier material selected from the group consisting of an ointment, a cream, a milk a lotion and an aerosol and an active ingredient consisting essentially of a combination of:

a. from about 1% to about 30% by weight based on said composition of a compound selected from the group consisting of cytosine, uracil, guanine, 5-chlorouracil and mixtures thereof: and b. from about 1% to about 20% by weight based on said composition of a sunscreen agent characterized by a maximum light absorption between 2900A and 3200A.

* * * * *